United States Patent [19]

Snider et al.

[11] Patent Number: 4,555,418
[45] Date of Patent: Nov. 26, 1985

[54] ALKOXYLATED AROMATIC AMINE-AROMATIC POLYESTER POLYOL BLEND AND POLYISOCYANURATE FOAM THEREFROM

[75] Inventors: Scott C. Snider, Pinellas Park; Alberto DeLeon, Clearwater, both of Fla.

[73] Assignee: The Celotex Corporation, Tampa, Fla.

[21] Appl. No.: 682,119

[22] Filed: Dec. 17, 1984

Related U.S. Application Data

[62] Division of Ser. No. 541,197, Oct. 12, 1983, Pat. No. 4,496,625.

[51] Int. Cl.[4] .................. C08G 18/14; C08G 18/32; C08G 18/42; C09K 3/00
[52] U.S. Cl. ........................... 427/373; 156/79; 252/182; 521/160; 521/167; 521/902; 427/244
[58] Field of Search .............. 156/79; 427/243, 244, 427/373; 521/160, 167, 902; 252/182

[56] References Cited

U.S. PATENT DOCUMENTS

| | | | |
|---|---|---|---|
| 3,255,253 | 6/1966 | Kuryla | 564/505 |
| 3,314,995 | 4/1967 | Cross et al. | 564/330 |
| 3,647,759 | 3/1972 | Walker | 528/296 |
| 3,723,317 | 3/1973 | Chow et al. | 521/117 |
| 3,914,190 | 10/1975 | Carroll et al. | 521/88 |
| 4,111,914 | 9/1978 | Kresta et al. | 528/40 |
| 4,113,667 | 9/1978 | Mori et al. | 521/163 |
| 4,118,533 | 10/1978 | Hipchen et al. | 428/297 |
| 4,169,921 | 10/1979 | Moss et al. | 521/125 |
| 4,204,019 | 5/1980 | Parker | 521/902 |
| 4,237,238 | 12/1980 | DeGuiseppi et al. | 521/131 |
| 4,246,364 | 1/1981 | Koehler et al. | 521/167 |
| 4,256,802 | 3/1981 | Koehler et al. | 521/167 |
| 4,277,571 | 7/1981 | Falkenstein et al. | 521/164 |
| 4,289,858 | 9/1981 | Koehler et al. | 521/131 |
| 4,296,170 | 10/1981 | Ohashi et al. | 428/422.8 |
| 4,302,551 | 11/1981 | Horn et al. | 521/163 |
| 4,339,343 | 7/1982 | Koehler et al. | 252/182 |
| 4,342,842 | 8/1982 | Hira et al. | 521/167 |
| 4,346,229 | 8/1982 | Derr et al. | 521/172 |
| 4,410,641 | 10/1983 | Narayan et al. | 521/167 |
| 4,411,949 | 10/1983 | Snider et al. | 428/304.4 |
| 4,417,001 | 11/1983 | Svoboda et al. | 521/114 |
| 4,421,871 | 12/1983 | Korczak | 521/167 |
| 4,459,334 | 7/1984 | Blanpied | 428/319.1 |

OTHER PUBLICATIONS

Technical Data Bulletin, BASF Wyandotte Corporation, Polymers Group, Parsippany, N.J., 10/79.

Primary Examiner—William J. Van Balen
Attorney, Agent, or Firm—James W. Grace; Charles W. Vanecek

[57] ABSTRACT

Polyisocyanurate foams are prepared by reacting together an organic polyisocyanate, a blowing agent, a trimerization catalyst, and a minor amount of a polyol blend comprising (a) about 5 percent to about 95 percent by weight of said blend of an alkylene oxide adduct of an aromatic amine of the formula

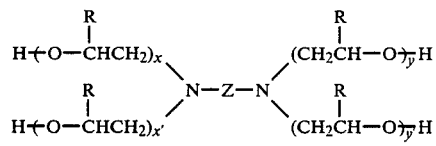

wherein Z is a divalent aromatic radical, x, x', y, and y' each independently have an average value from about 1 to about 5, and each R is independently selected from the group consisting of hydrogen, alkyl or aryl, provided that the adduct is capped with ethylene oxide units, and (b) about 5 percent to about 95 percent by weight of said blend of an aromatic polyester polyol having a molecular weight of from about 150 to about 5,000. Laminates of such foams exhibit a high degree of fire resistance, low foam friability, high compressive strength, and excellent facer adhesion.

20 Claims, 1 Drawing Figure

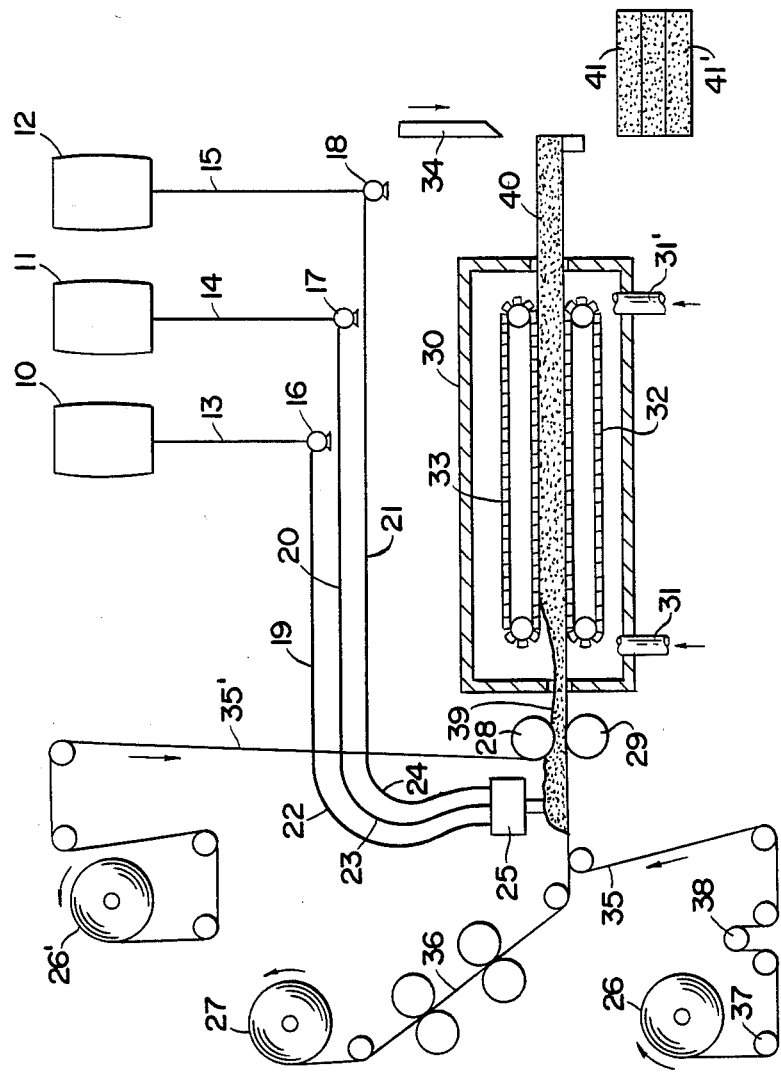

ALKOXYLATED AROMATIC AMINE-AROMATIC POLYESTER POLYOL BLEND AND POLYISOCYANURATE FOAM THEREFROM

This is a division of application Ser. No. 541,197, filed Oct. 12, 1983, now U.S. Pat. No. 4,496,625.

BACKGROUND OF THE INVENTION

1. Field of the Invention

This invention relates to the preparation of a laminate using a polyisocyanurate foam as a core material. The foam is produced from an organic polyisocyanate and a polyol blend comprising (a) an alkylene oxide adduct of an aromatic amine capped with primary hydroxyl groups, and (b) an aromatic polyester polyol.

2. Description of the Prior Art

Polyisocyanurate foams are well known and are described, for example, in U.S. Pat. Nos. 3,799,896 and 3,940,517 and in U.K. Pat. No. 1,155,768. It is also known to employ polyisocyanurate foams as the core of laminated foam board stock material which can be prepared with a variety of different facer materials, as described, for example, in U.S. Pat. No. 3,940,517, supra. Unfortunately, the adhesion of the facer material to the foam core has not been as great as desired. Poor facing sheet adhesion can result in delamination.

OBJECTS OF THE INVENTION

It is an object of the present invention to provide an improved polyisocyanurate foam having a combination of advantageous properties, including a reduced friability and high thermal stability and compressive strength, and a method of producing the foam.

It is another object of the present invention to provide a polyisocyanurate foam which has improved facing sheet adhesion without adversely affecting the other physical and chemical properties of the foam.

It is still another object of the present invention to produce an improved laminate having a facing sheet which adheres tenaciously to a polyisocyanurate foam core without altering other advantageous properties of the foam, such as a low friability and flammability.

It is a further object of the present invention to provide an efficient, energy saving process requiring reduced production time and cure temperatures for producing a laminate of a polyisocyanurate foam having improved facing sheet adhesion and moldability, while maintaining other advantageous physical properties of the laminate, such as superior fire resistant properties, which would qualify for approval by the Factory Mutual Research Corporation, as, e.g., a Class I rating in the Factory Mutual calorimeter test for roof insulation products.

It is a still further object of the present invention to provide a polyol blend for use in preparing polyisocyanurate foams of reduced friability, high thermal stability and compressive strength, and excellent facer adhesion.

These and other objects and advantages of the present invention will become more apparent by reference to the following detailed description and drawing which is a side schematic representation of an apparatus suitable for producing a polyisocyanurate foam material in accordance with the present invention.

DESCRIPTION OF THE INVENTION

The above objects have been achieved and the drawbacks of the prior art have been overcome by the development of an improved polyisocyanurate foam, which is prepared by reacting an organic polyisocyanate with a polyol blend comprising (a) an alkylene oxide adduct of an aromatic amine capped with ethylene oxide, and (b) an aromatic polyester polyol in the presence of a blowing agent and a catalyst(s).

Component (a) of the polyol blend of the invention comprises from about 5 percent to about 95 percent by weight of said blend of an addition product of an aromatic amine with an alkylene oxide or mixture of alkylene oxides. The adduct may be represented by the formula

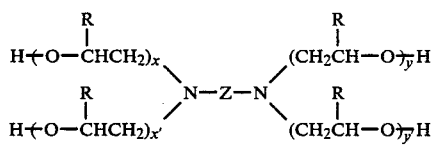

wherein Z is a divalent aromatic radical which can be substituted or unsubstituted, x, x', y, and y' each independently have an average value from about 1 to about 5, and each R is independently selected from the group consisting of hydrogen, alkyl or aryl, provided that the adduct is capped with ethylene oxide units. The group Z may be selected from a xylylene group, arylene groups selected from ortho, meta or para phenylene, xylene, tolylene, biphenylene, naphthylene or anthrylene, or a substituted arylene group of the formula

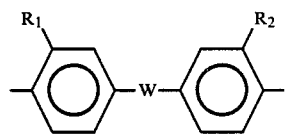

wherein W is a covalent bond, sulfur, carbonyl, —NH, —N—(lower)alkyl, O, S, SS, —N—phenyl, sulfonyl, a linear or branched alkylene group of from 1 to 3 carbon atoms, arylene, especially phenylene group, or a dialkyl or diaryl silyl group, and $R_1$ and $R_2$ are independent and each is hydrogen, halogen, especially chloro or bromo, lower alkyl from 1 to 5 carbon atoms, especially methyl, lower alkoxy containing from 1 to 5 carbon atoms, especially methoxy, or aryl, especially phenyl.

Examples of alkoxylated aromatic amines useful in the present invention are the alkoxylated adducts of 4-chloro-o-phenylenediamine, 4-chloro-m-phenylenediamine, 3,3'-diaminobenzidine, 2,4-diaminotoluene, 2,6-diaminotoluene, 3,4-diaminotoluene, 4,5-dichloro-o-phenylenediamine, 4,5-dimethyl-o-phenylenediamine, 4-methoxy-o-phenylenediamine, 4,4'-methylenebis-(o-chloroaniline), 4,4'-methylenedianiline, 4,4'-methylenebis-(3-nitroaniline), 2-nitro-p-phenylenediamine, o-phenylenediamine, m-phenylenediamine, p-phenylenediamine and 1,5-diaminonaphthalene.

A preferred alkoxylated aromatic amine of the blend is an ethylene oxide adduct of toluene diamine isomers of the formula

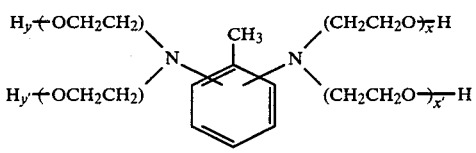

wherein the average number of oxyethylene units per polyoxyethylene chain is from 2 to 3. An example of a suitable, commercially available aromatic-amino polyether polyol of the blend is the product sold by BASF Wyandotte Corporation under the trademark Pluracol Polyol 735.

The polyols of component (a) of the blend can be produced by adding an alkylene oxide to an aromatic amine in the presence of an acid or alkali catalyst. Any suitable alkylene oxide or mixture of alkylene oxides can be used in the preparation of the adduct, such as, for example, ethylene oxide, 1,2-propylene oxide, 1,2-butylene oxide, and the like, provided that the adduct is capped with ethylene oxide units to provide terminal primary hydroxyl groups. The polyols of component (a) can be used alone or as a mixture thereof. The OH value of the polyol can be varied by controlling the amount of alkylene oxide added during the synthesis. The alkoxylated aromatic amines generally have a hydroxyl equivalent weight of from about 75 to 250, preferably from about 100 to 150.

The polyols of component (b) of the blend comprise polyesters containing at least two hydroxyl groups, which generally have a molecular weight of from about 150 to 5,000. Preferably, the polyesters contain from 2 to 8 hydroxyl groups and have a molecular weight of from about 220 to 800, more preferably from about 270 to 400. The acid component of these polyesters comprises at least 40% by weight of phthalic acid residues. By phthalic acid residue is meant the group

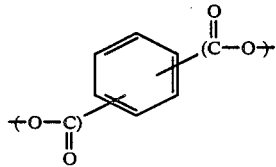

These polyesters include, for example, reaction products of polyhydric, preferably dihydric and optionally trihydric, alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. O-phthalic acids, isophthalic acids and/or terephthalic acids may be used as the phthalic acid. The optional polybasic-carboxylic acids may be aliphatic, cycloaliphatic, aromatic and/or heterocyclic and may be substituted, for example, with halogen atoms and/or may be unsaturated. The following are mentioned as examples: succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, dimeric and trimeric fatty acids, such as oleic acid, optionally mixed with monomeric fatty acids. Suitable polyhydric alcohols include, for example, ethylene glycol, propylene glycol-(1,2) and -(1,3), octane diol-(1,8), neopentyl glycol, cyclohexane dimethanol, (1,4-bis-hydroxymethylcyclohexane), 2-methyl-1,3-propane diol, glycerol, trimethylolpropane, hexanetriol-(1,2,6), butane triol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol, and polybutylene glycols. The polyesters may also contain carboxyl end groups. Polyesters of lactones, such as $\epsilon$-caprolactone, or hydroxycarboxylic acids, such as $\omega$-hydroxycaproic acid, may also be used.

A preferred hydroxy terminated aromatic polyester for use as component (b) in the present invention is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, the disclosure of which is hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Del. under the trade name of Terate ® resins.

An excess of the transesterifying glycol advantageously may be used to react with the residue defined above. The amount of this preferred excess of transesterifying glycol remaining in the transesterified polyol mixture can vary broadly but suitably falls within a range of from about 5 to about 30 percent by weight of said polyol mixture.

The properties of the transesterified polyol mixtures which can be employed as component (b) in accordance with the present invention fall within rather broad ranges. The polyol mixtures are described in U.S. Pat. No. 4,237,238, the disclosure of which is hereby incorporated by reference. A preferred polyol mixture is characterized by a viscosity in cps at 25° C. of about 1,600 to about 2,800, a free diethylene glycol content of from about 20 to about 30 percent by weight of said mixture, a hydroxyl number within a range of from about 400 to about 490, and an acid number of about 0.2 to about 8.

Another preferred aromatic polyester polyol which can be employed as component (b) of the polyol blend of the invention is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An expecially useful polyol mixture can be prepared by transesterifying a by-product fraction from the manufacture of dimethyl terephthalate comprising a mixture of (a) about 40 to 60 percent by weight of dimethyl terephthalate, (b) about 1 to 10 percent by weight of monomethyl terephthalate, (c) about 1 to 2 percent by weight of terephthalic acid, (d) about 10 to 25 percent by weight of bi-ring esters, (e) about 5 to 12 percent by weight of organic acid salts, (f) about 18 to 25 percent by weight of polymeric materials, and (g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. An example of a transesterified by-product fraction of the invention is the product supplied by Jim Walter Resources, Inc. under the trade designation Foamol 250.

The properties of the polyol mixture produced by transesterifying the by-product fraction defined above are described in U.S. Pat. No. 4,411,949, the disclosure of which is hereby incorporated by reference. A preferred polyol mixture is characterized by a viscosity in cps at 25° C. of about 700 to about 2500, a free diethylene glycol content of from about 10 to about 30 percent by weight of said mixture, a hydroxyl number within a range of from about 350 to about 468, and an acid number of about 0.2 to about 10.

Other desirable aromatic polyester polyol materials for use in the present invention are those described in U.S. application Ser. No. 372,904, filed Apr. 29, 1982, the disclosure of which application is hereby incorporated by reference.

The polyol blend containing components (a) and (b) can be obtained simply by mixing together, at the time of use in producing the rigid polyisocyanurate foam of the invention, the individual components (a) and (b), which are synthesized separately prior to use. Preferably, the alkoxylated aromatic amine is employed within a range of from about 10 to 50, more preferably about 20 to 40, percent by weight of the blend while the aromatic polyester polyol is employed within a range of from about 50 to 90, more preferably about 60 to 80, percent by weight. A preferred polyol blend of the invention comprises about 30 percent by weight of the ethoxylated aromatic amine, Pluracol Polyol 735, and about 70 percent by weight of the aromatic polyester polyol, Foamol 250. The blend is a liquid having a hydroxyl number of 362-415 and a Brookfield viscosity at 25° C. of 2300-2950. Another preferred blend comprises about 25 percent by weight of Pluracol ® Polyol 735 and about 75 percent by weight of the aromatic polyester polyol supplied by Hercules Inc. under the trademark "Terate 202".

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2,4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenylmethane-4,4'-diisocyanate, 4,4'-diphenylenediisocyanate, 3,3'-dimethoxy-4,4'-biphenyl diisocyanate, 3,3'-dimethyl-4,4'-biphenyldiisocyanate, and 3,3'-dimethyldiphenylmethane-4,4'-diisocyanate; the triisocyanates such as 4,4',4''-triphenylmethane-triisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. These isocyanates are prepared by conventional methods known in the art such as the phosgenation of the corresponding organic amine.

In a preferred rigid foam of the invention, the organic polyisocyanate is polymethylene polyphenylisocyanate. The polymethylene polyphenylisocyanates desirably have a functionality of at least 2.1 and preferably 2.5 to 3.2. These preferred polymethylene polyphenylisocyanates generally have an equivalent weight between 120 and 180 and preferably have an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

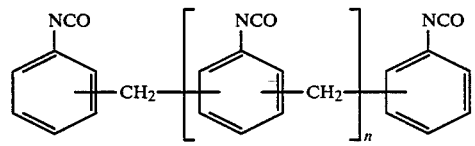

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6-21. It should, therefore, be understood that the polymethylene polyphenylisocyanates available on the market under the tradenames of CODE 047 or PAPI-20 (Upjohn) and Mondur MR-200 (Mobay) can successfully be employed within the spirit and scope of the present invention.

In order to ensure complete reaction, the polymethylene polyphenylisocyanate and the polyol blend are generally mixed in an equivalent ratio of 1.5:1 to 6:1 and preferably 2:1 to 5:1. In ranges outside these proportions the reaction yields a product having undesirable physical characteristics. At higher ratios the product has an undesirably high friability. At lower ratios the product has an undesirably high flammability.

In the preparation of these polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris(dimethylaminomethyl)phenol, and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Any blowing agent typically employed in similar prior art foam products containing polyisocyanurate linkages can be employed in the foam compositions of the present invention. In general, these blowing agents are liquids having a boiling point between minus 50° C. and plus 100° C. and preferably between 0° C. and 50° C. The preferred liquids are hydrocarbons or halohydrocarbons. Examples of suitable blowing agents include, among others, chlorinated and fluorinated hydrocarbons such as trichlorofluoromethane, $CCl_2FCClF_2$, $CCl_2FCF_3$, diethylether, isopropyl ether, n-pentane, cyclopentane, and 2-methylbutane. Trichlorofluoromethane is a preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20 weight percent of the composition. When the blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193". Other suitable surfactants are those described in U.S. Pat. No. 4,365,024 and U.S. application Ser. No. 490,279, filed May 2, 1983. Generally, the surfactant comprises from about 0.05 to 10, and preferably from 0.1 to 6, weight percent of the foam-forming composition.

Other additives may also be included in the foam formulations. Included are flame retardants, such as tris(2-chloroethyl)-phosphate, dispersing agents, plasticizers, fillers and pigments.

The polyisocyanurate foams of the present invention are simply produced by mixing the components with the result that foaming and curing take place. The mixing can be accomplished at 0° to 50° C., and preferably at 10° to 30° C. The process can be practiced as a batch or continuously.

The laminate of the present invention can be formed by contacting the foaming mixture with any of the sheet materials or facers conventionally employed in laminated foam insulation products. Such facing materials include, but are not limited to, metal, paper, corrugated cardboard, plastics, wood, glass and textiles. In some cases, adhesion can be improved by coating the facing materials before lamination with conventional coating compositions such as vinyl or epoxy compounds. Particularly suitable facers for use in the invention are asphalt fiber glass facers, asphalt-saturated roofing felt, perlite board, aluminum foil, and fiberboard.

Referring now to the drawing, there is shown schematically an apparatus suitable for use in connection with the present invention. The apparatus comprises an isocyanate tank 10, a polyol tank 11, and a catalyst tank 12, each respectively connected to outlet lines 13, 14, and 15. The temperatures of the ingredients are controlled to ensure satisfactory processing. The lines 13, 14, and 15 form the inlet to metering pumps 16, 17, and 18. The pumps 16, 17, and 18 discharge respectively through lines 19, 20, and 21 which are in turn respectively connected to flexible lines 22, 23, and 24. The flexible lines 22, 23, and 24 discharge to mixing head 25. The apparatus is also provided with a roll 26 of lower facing sheet material and a roll 26' of upper facing sheet material. The apparatus also can be provided with a roll 27 of glass fiber mat material when it is desired to reinforce the structural laminate. The apparatus also includes metering rolls 28 and 29, and an oven 30 provided with vents 31, 31' for blowing hot air. Lower and upper endless conveyors 32 and 33 are positioned in oven 30 to contain the expanding foam. Both endless conveyors 32 and 33 can comprise a series of articulated platens, such as described in U.S. Pat. No. 4,043,719, the disclosure of which is incorporated herein by reference. The apparatus is also provided with pull rolls (not shown) for pulling the facing sheets and optional glass fiber mat through the apparatus, and cutting means 34. In another embodiment of the invention, a rigid facer such as perlite board is continuously conveyed along the production line in place of the lower facing sheet material. The individual perlite boards are transported along the line by means of conveyor rollers (not shown).

In operation, the isocyanate tank 10 is charged with an organic polyisocyanate admixed with a blowing agent and surfactant, and the polyol tank 11 is charged with the polyol blend of the invention, and the catalyst tank 12 is charged with a catalyst composition. The speeds of the pumps 16, 17, and 18 are adjusted to give the desired ratios of the ingredients in the tanks 10, 11, and 12. These ingredients pass respectively through lines 19, 20, and 21 as well as lines 22, 23, and 24, whereupon they are mixed in the mixing head 25 and discharged therefrom. Optionally, lines 20 and 21 can feed into a single conduit for delivery to the mixing head. By virtue of rotation of the pull rolls, lower facing sheet 35 is pulled from the roll 26, and upper facing sheet 35' is pulled from the roll 26', and, when applicable, glass fiber mat 36 is pulled from the roll 27. The facing sheet and glass fiber mat materials pass over idler rollers such as idler rollers 37 and 38 and are directed to the nip between metering rolls 28, 29. The mixing head 25 is caused to move back and forth, i.e., out of the plane of the paper by virtue of its mounting on a reciprocating mechanism (not shown). In this manner, an even amount of material can be maintained upstream of the nip between the metering rolls 28, 29. The composite structure at this point now comprising a lower facing sheet 35, an upper facing sheet 35' on either side of a foam-forming mixture 39 and optionally a mat 36 of glass fibers, now passes into the oven 30. While in the oven 30 the foam-forming mixture expands under the influence of heat added by the hot air from vents 31, 31' and due to the heat generated in the exothermic reaction between the polyol blend and the isocyanate in the presence of the catalyst. As the foam expands upwardly, it comes into contact with upper facing sheet 35', forcing the sheet against conveyor 33 and causing the sheet to assume a substantially planar disposition on the upper correspondingly planar surface of the foam. The temperature within the oven is controlled by varying the temperature of the hot air from vents 31, 31', in order to insure that the temperature within the oven 30 is maintained within the limits necessary to cure the foam employed, as, e.g., from 100° F. to 350° F. and preferably 150° F. to 250° F. The structural laminate 40 then leaves the oven 30, and is cut by cutting means 34 into individual panels 41, 41'.

While the structural laminate of the invention can contain various reinforcement materials, in a preferred embodiment glass fiber mat 36 comprises a thin, substantially incompressible yet expansible mat of glass fibers, as described in U.S. Pat. Nos. 4,118,533 and 4,284,683, the disclosures of which are hereby incorporated by reference. This thin mat 36 of glass fibers is distinguished by having the fibers arranged in layers, and the fibers within each layer are long, generally having a length greater than one foot and preferably 5 to 12 feet, and at an angle to the fibers in each next adjacent layer. Before passing through the nip of the metering rolls, thin fiber mat 36 is advantageously passed through intermeshing corrugated rolls (not shown), which effect a transverse stretching of the mat, as described in U.S. Pat. No. 4,346,133. When the mat 36 of glass fibers thereafter passes through the nip between the two rotating metering rolls 28 and 29, pressure is applied to the mat by the metering rolls, causing the foam-forming mixture 39 to penetrate the interstices between the glass fibers forming the mat. After passing through the nip, the glass fibers expand under the influence of the expansion of the foam-forming mixture 39 and become distributed in the foam core of the structural laminate.

Numerous modifications to the apparatus will be immediately apparent to those skilled in the art. For example, the tanks 10, 11, and 12 can be provided with refrigeration means in order to maintain the reactants at subambient temperatures.

The use of aromatic polyester polyols as the polyol component in the manufacture of polyisocyanurate foam laminates can result in poor facer adhesion during the time period immediately following production of the laminate. This can bring about handling problems and delamination of the facers. While the adhesion may be improved by further heat treatment and/or storage of the laminate, employment of the inventive polyol blend makes it possible to produce polyisocyanurate foam laminates whose facers already strongly adhere to the foam core right after production, without the extra time and expense required in the case of laminates based solely on aromatic polyester polyols.

The invention is further illustrated by the following example in which all parts and percentages are by weight unless otherwise indicated.

EXAMPLE

This example illustrates the process of the present invention and a comparative process for producing structural laminates by reference to the drawing.

A. ISOCYANURATE FORMULATIONS USED IN PREPARING FOAM CORE OF STRUCTURAL LAMINATES

The inventive polyol blend and a comparative aromatic polyester polyol were employed in preparing the foam cores of the structural laminates of the following Table II, utilizing the inventive isocyanurate formulations 1 to 4, and comparative isocyanurate formulations 5 and 6 of the following Table I.

B. PRODUCTION OF STRUCTURAL LAMINATES

The production of each structural laminate can be illustrated with reference to the drawing. For each laminate, items A, G and H of the respective formulation were mixed with each other and placed in tank 10. Items B and C, in the case of each inventive formulation, were mixed and placed in tank 11, whereas, in the case of the comparative formulations, item B alone was placed in tank 11. The catalytic composition comprising a solution of items D and E in items F and F' or F alone (inventive formulation 2) was placed in tank 12 in the production of each laminate. Table II below shows for the production of each of laminates A to F the top and bottom facers utilized, the quantity of reinforcing glass fiber mat utilized, and the oven temperature. For each run, the apparatus was provided with rolls 26', 26 of the top and bottom facers, and a roll 27 of glass fiber mat material. The mat 36 of glass fibers was substantially incompressible. The glass fibers forming the mat were long, generally straight fibers having an average diameter of less than 25 microns and lengths varying from 5 to 12 feet with an average length of over 5 feet.

With the oven 30 heated to an appropriate temperature, the facers and glass fiber mat were fed toward the nip of metering rolls 28 and 29, and the pumps 16, 17 and 18 were started to discharge the contents of the tanks 10, 11 and 12 into the respective feed lines to carry the ingredients to the mixing head 25. The glass fiber mat was stretched by being passed through a pair of intermeshing corrugated rolls to effect a rupture of some of the fiber to fiber bonds. The mixing head 25 deposited the foam forming mixture onto the lower facer and both upper and lower facers, glass fiber mat, and foamable mixture were then conveyed into the oven 30 to produce each of laminated structural panels A to F.

Various properties of the resulting structural laminates are reported in Table III below. The physical property data presented in Table III reveal that use of the aromatic-amino polyether polyol in combination with the aromatic polyester polyol used in preparing the foam core of comparative structural laminates E and F has no adverse effect on resulting inventive structural laminates A to D. Most importantly, the inventive structural laminates displayed a facer adhesion which was far superior to that of the laminates made with an aromatic polyester polyol as the sole polyol, indicating that the aromatic-amino polyether polyol is eminently suitable to partially replace the polyester polyol in the production of structural laminates.

TABLE I

| | | INVENTIVE FORMULATIONS | | | | COMPARATIVE FORMULATIONS | |
|---|---|---|---|---|---|---|---|
| | | 1 | 2 | 3 | 4 | 5 | 6 |
| Item | Ingredient | (parts by weight) | | | | (parts by weight) | |
| A | Polymethylene polyphenyl isocyanate[1] | 206 | 213 | 206 | 206 | 220 | 220 |
| B | Aromatic polyester polyol[2] | 67.2 | 60.9 | 51.8 | 43.1 | 80 | 80 |
| C | Aromatic-amino polyether polyol[3] | 28.8 | 26.1 | 22.2 | 18.5 | — | — |
| D | 2,4,6-tris(dimethylaminomethyl) phenol[4] | .83 | .77 | .83 | .83 | .83 | .83 |
| E | Potassium-2-ethyl hexoate[4] | 1.75 | 3.24 | 1.75 | 1.75 | 1.75 | 1.75 |
| F | Diethylene glycol[4] | .75 | 6.00 | .75 | .75 | .75 | .75 |
| F' | Polyoxyethylene glycol[4] | 6.67 | — | 6.67 | 6.67 | 6.67 | 6.67 |
| G | $CFCl_3$ | 55.5 | 55.5 | 55.5 | 55.5 | 55.5 | 55.5 |
| H | Polydimethylsiloxane polyoxyalkylene copolymers[5] | 3.5 | 3.5 | 3.5 | 3.5 | 3.5 | 3.5 |

[1] Item A is a polymethylene polyphenyl isocyanate having an equivalent weight of 138, an acidity of 0.03% HCl, and a viscosity of 2000 centipoises at 25° C. and is available from the Mobay Chemical Company, Pittsburgh, Pa. under the trade name MONDUR MR-200.
[2] Item B is that supplied by Jim Walter Resources, Inc. under the trade name Foamol 250.
[3] Item C is that supplied by BASF Wyandotte Corporation under the trade name Pluracol ® Polyol 735.
[4] Items D and E are employed in the form of a solution in the diethylene glycol (item F) and polyoxyethylene glycol (item F'), or, in the case of formulation 2, in the diethylene glycol only.
[5] Item H is a surfactant supplied by the Union Carbide Corporation under the trade name L-5340.

TABLE II

PRODUCTION OF STRUCTURAL LAMINATES

| Structural Laminate | Formulation Utilized | Facers* | Glass Fiber Mat (gm/ft$^2$) | Oven Temp. (°F.) |
|---|---|---|---|---|
| A | 1 | Asphalt-saturated roofing felt | 4.0 | 190 |
| B | 2 | Fiber glass coated on both sides with clay-filled asphalt emulsion | 5.6 | 160 |
| C | 3 | Fiber glass coated on both sides with clay-filled asphalt emulsion | 4.0 | 225 |
| D | 4 | Fiber glass coated on both sides with clay-filled asphalt emulsion | " | 225 |
| E | 5 | Asphalt-saturated roofing felt | " | 180 |
| F | 6 | Fiber glass coated on both sides with clay-filled asphalt emulsion | " | 210 |

*All laminates faced on top and bottom by facing material shown.

TABLE III

PROPERTIES OF STRUCTURAL LAMINATES

| Structural Laminate | Thickness (in) | Density (lb/ft$^3$) | Oxygen Index[2] | Closed Cells (%)[3] | Friability[4] (%) | Compressive Strength[5] (p.s.i.) | Adhesion[6] |
|---|---|---|---|---|---|---|---|
| A | 1.4 | 2.25 | 22.8 | 91.0 | 5.0 | 21.9 | Very good |
| B[1] | 3.0 | 2.02 | — | 87.6 | — | — | " |
| C | 1.2 | 2.01 | 23.2 | 89.6 | 10.3 | 25.9 | " |
| D | 1.2 | 2.09 | 24.8 | 88.0 | 12.1 | 20.9 | " |
| E | 1.4 | 2.43 | 23.1 | 90.6 | 7.4 | 24.5 | Poor |
| F | 1.4 | 2.35 | 23.9 | 89.3 | 11.7 | 20.8 | " |

[1] Received a Class I rating in the Factory Mutual calorimeter test.
[2] Flammability test conducted according to ASTM D-2863-70, except that a sample measuring ¼" × ¼" × 6" was used.
[3] According to ASTM Test Method D-2856-70.
[4] According to ASTM Test Method C-421.
[5] According to ASTM Test Method D-1621-73.
[6] Adhesion of facers to foam core was evaluated after laminate was conveyed from oven and facers were allowed to cool to ambient temperature. The quality of the facer adhesion was judged by determining how difficult it was to peel the facers from the foam.

We claim:
1. A polyisocyanurate foam comprising the reaction product of an organic polyisocyanate, a blowing agent, a trimerization catalyst, and a minor amount of a polyol blend comprising
    (a) about 5 percent to about 95 percent by weight of said blend of an alkylene oxide adduct of an aromatic amine of the formula

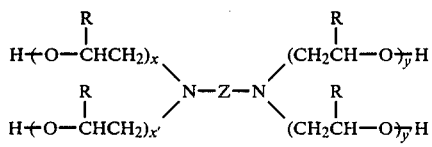

wherein Z is a divalent aromatic radical, x, x', y, and y' each independently have an average value from about 1 to about 5, and each R is independently selected from the group consisting of hydrogen, alkyl or aryl, provided that the adduct is capped with ethylene oxide units, and (b) about 5 percent to about 95 percent by weight of said blend of an aromatic polyester polyol having a molecular weight of from about 150 to about 5,000.

2. The polyisocyanurate foam of claim 1 wherein said organic polyisocyanate is a polymethylene polyphenylisocyanate.

3. The polyisocyanurate foam of claim 2 wherein said alkylene oxide adduct of an aromatic amine is an ethylene oxide adduct of toluene diamine isomers of the formula

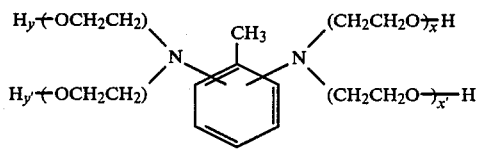

wherein the average number of oxyethylene units per polyoxyethylene chain is from 2 to 3.

4. The polyisocyanurate foam of claim 1 wherein said organic polyisocyanate is a mixture of components of the formula

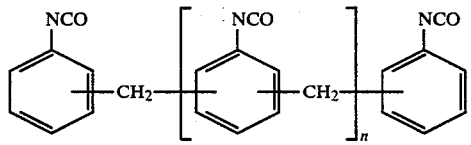

wherein n is an integer from 0 to 8 inclusive, and said mixture has:
(a) a functionality of 2.1 to 3.2,
(b) an equivalent weight between 120 and 180, and
(c) a viscosity at 25° C. between 150 and 2500 centipoises.

5. The polyisocyanurate foam of claim 1 wherein said aromatic polyester polyol is a polyol mixture prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials.

6. The polyisocyanurate foam of claim 5 wherein said by-product fraction from the manufacture of dimethyl terephthalate comprises a mixture of
(a) about 40 to 60 percent by weight of dimethyl terephthalate,
(b) about 1 to 10 percent by weight of monomethyl terephthalate,
(c) about 1 to 2 percent by weight of terephthalic acid,
(d) about 10 to 25 percent by weight of bi-ring esters,
(e) about 5 to 12 percent by weight of organic acid salts,
(f) about 18 to 25 percent by weight of polymeric materials, and
(g) about 1 to 4 percent by weight of ash.

7. The polyisocyanurate foam of claim 1 wherein said aromatic polyester polyol is a polyol mixture prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids.

8. The polyisocyanurate foam of claim 1 wherein said organic polyisocyanate is a polymethylene polyphenylisocyanate, and said aromatic polyester polyol is a member selected from the group consisting of
(a) a polyol mixture prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials,
(b) a polyol mixture prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids, and
(c) mixtures thereof, the equivalent ratio of said organic polyisocyanate to said polyol blend being about 1.5:1 to 6:1, and the weight ratio of said alkylene oxide adduct of an aromatic amine to said aromatic polyester polyol being about 1:9 to 1:1.

9. The polyisocyanurate foam of claim 8 wherein said alkylene oxide adduct of an aromatic amine is an ethylene oxide adduct of toluene diamine isomers of the formula

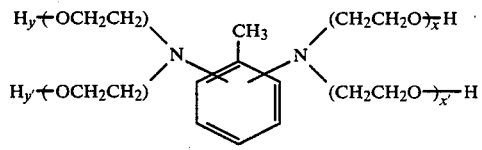

wherein the average number of oxyethylene units per polyoxyethylene chain is from 2 to 3.

10. The polyisocyanurate foam of claim 8 wherein
(1) said polyol mixture (a) is transesterified with diethylene glycol and is characterized by a viscosity in cps at 25° C. of about 700 to 2500, a free diethylene glycol content of from about 10 to 30 percent by weight of said mixture, a hydroxyl number within a range of from about 350 to 468, and an acid number of about 0.2 to 10, and
(2) said polyol mixture (b) is transesterified with diethylene glycol and is characterized by a viscosity in cps at 25° C. of about 1,600 to about 2,800, a free diethylene glycol content of from about 20 to about 30 percent by weight of said mixture, a hydroxyl number within a range of from about 400 to about 490, and an acid number of about 0.2 to about 8.

11. The polyisocyanurate foam of claim 10 wherein said alkylene oxide adduct of an aromatic amine of the blend is an ethylene oxide adduct of toluene diamine isomers of the formula

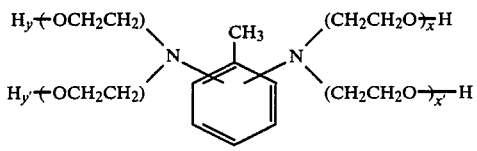

wherein the average number of oxyethylene units per polyoxyethylene chain is from 2 to 3.

12. The polyisocyanurate foam of claim 11 wherein the weight ratio of said alkylene oxide adduct of an aromatic amine to said aromatic polyester polyol is about 1:4 to 1:1.5.

13. The polyisocyanurate foam of claim 12 wherein said blowing agent is a fluorocarbon and said trimerization catalyst comprises a mixture of a tertiary amino phenol and an alkali metal carboxylate.

14. The polyisocyanurate foam of claim 13 wherein said trimerization catalyst comprises a mixture of 2,4,6-tris(dimethylaminomethyl)phenol and potassium-2-ethyl hexoate in an equivalent ratio of about 0.4:1 to 2.5:1.

15. A process for producing the polyisocyanurate foam of claim 1 comprising reacting together under foam-forming conditions an organic polyisocyanate, a blowing agent, a trimerization catalyst, and a minor amount of a polyol blend comprising (a) about 5 percent to about 95 percent by weight of said blend of an alkylene oxide adduct of an aromatic amine of the formula

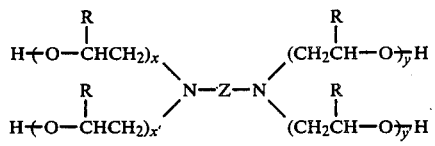

wherein Z is a divalent aromatic radical, x, x', y, and y' each independently have an average value from about 1 to about 5, and each R is independently selected from the group consisting of hydrogen, alkyl or aryl, provided that the adduct is capped with ethylene oxide units, and (b) about 5 percent to about 95 percent by weight of said blend of an aromatic polyester polyol having a molecular weight of from about 150 to about 5,000.

16. A process for producing a laminate comprising (a) contacting a facing sheet with a polyisocyanurate foam-forming mixture comprising an organic polyisocyanate, a blowing agent, a trimerization catalyst, and a minor amount of a polyol blend comprising (i) about 5 percent to about 95 percent by weight of said blend of an alkylene oxide adduct of an aromatic amine of the formula

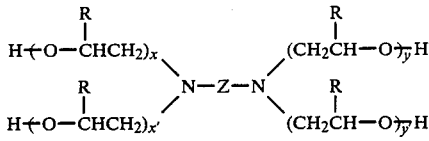

wherein Z is a divalent aromatic radical, x, x', y, and y' each independently have an average value from about 1 to about 5, and each R is independently selected from the group consisting of hydrogen, alkyl or aryl, provided that the adduct is capped with ethylene oxide units, and (ii) about 5 percent to about 95 percent by weight of said blend of an aromatic polyester polyol having a molecular weight of from about 150 to about 5,000, and (b) foaming said foam-forming mixture.

17. A polyol blend comprising (a) about 5 percent to about 95 percent by weight of said blend of an alkylene oxide adduct of an aromatic amine of the formula

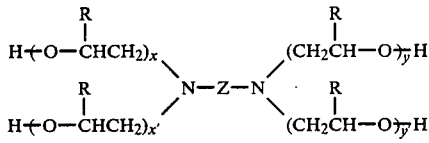

wherein Z is a divalent aromatic radical, x, x', y, and y' each independently have an average value from about 1 to about 5, and each R is independently selected from the group consisting of hydrogen, alkyl or aryl, provided that the adduct is capped with ethylene oxide units, and (b) about 5 percent to about 95 percent by weight of said blend of an aromatic polyester polyol having a molecular weight of from about 150 to about 5,000.

18. The polyisocyanurate foam of claim 2 wherein the weight ratio of said alkylene oxide adduct of an aromatic amine to said aromatic polyester polyol is about 1:9 to 1:1.

19. The polyisocyanurate foam of claim 18 wherein said blowing agent is a halohydrocarbon selected from the group consisting of chlorinated hydrocarbons, fluorinated hydrocarbons and mixtures thereof.

20. The polyisocyanurate foam of claim 19 wherein said trimerization catalyst comprises a mixture of a tertiary amino phenol and an alkali metal carboxylate.

* * * * *